(12) United States Patent
Deneef

(10) Patent No.: US 9,117,214 B2
(45) Date of Patent: Aug. 25, 2015

(54) SYSTEM FOR SELECTING AND PURCHASING PRODUCTS FROM A PREDETERMINED MANUFACTURER OR RETAILER

(75) Inventor: Philippe Deneef, Haasrode (BE)

(73) Assignee: VIVABOXES INTERNATIONAL, Diegem (BE)

( * ) Notice: Subject to any disclaimer, the term of this patent is extended or adjusted under 35 U.S.C. 154(b) by 1245 days.

(21) Appl. No.: 11/752,641

(22) Filed: May 23, 2007

(65) Prior Publication Data

US 2008/0005012 A1    Jan. 3, 2008

Related U.S. Application Data

(63) Continuation-in-part of application No. 10/740,668, filed on Dec. 22, 2003.

(30) Foreign Application Priority Data

Dec. 24, 2002 (BE) .................................. 2002/0747

(51) Int. Cl.
G06Q 40/00 (2012.01)
G06Q 30/00 (2012.01)
G06Q 40/04 (2012.01)

(52) U.S. Cl.
CPC ................ G06Q 30/00 (2013.01); G06Q 40/04 (2013.01)

(58) Field of Classification Search
USPC .......................................................... 705/35
See application file for complete search history.

(56) References Cited

U.S. PATENT DOCUMENTS

| | | | | |
|---|---|---|---|---|
| 1,523,783 | A * | 1/1925 | Lansden | 40/642.02 |
| 2,061,139 | A * | 11/1936 | Cohen | 206/489 |
| 4,558,783 | A | 12/1985 | Dangerfield et al. | |
| 5,314,176 | A * | 5/1994 | Schmitt | 270/1.03 |
| 5,513,117 | A | 4/1996 | Small | |
| 5,794,634 | A | 8/1998 | Noren et al. | |
| 5,839,117 | A | 11/1998 | Cameron et al. | |
| 5,870,718 | A | 2/1999 | Spector | |
| 5,963,916 | A | 10/1999 | Kaplan | |
| 6,053,536 | A * | 4/2000 | Clevenstine | 283/116 |
| 6,138,106 | A * | 10/2000 | Walker et al. | 705/14.1 |
| 6,240,397 | B1 | 5/2001 | Sachs | |
| 6,357,584 | B1 | 3/2002 | Simpson | |
| 6,371,334 | B1 | 4/2002 | Lombardi | |

(Continued)

FOREIGN PATENT DOCUMENTS

WO    WO 2005/054078 A1    12/2004

OTHER PUBLICATIONS

Journal, ("Under £50; [01A Edition]", Newcastle-upon Tyne (UK), Feb. 8, 2005, p. 18).*

Primary Examiner — Olabode Akintola
(74) Attorney, Agent, or Firm — Sughrue Mion, PLLC

(57) ABSTRACT

System, for selecting and purchasing products or services from a predetermined manufacturer or retailer, including a first device, in the form of a physical receptacle, for containing a plurality of second devices for presentation of a product or service from an assortment of products and/or services from a predetermined manufacturer, provider and/or retailer, each product or service for which a second presentation device is contained by the first device being selected from the assortment, and wherein the system also includes a voucher of a nominal value to be used for purchasing a product and/or service chosen from the assortment.

8 Claims, 4 Drawing Sheets

(56) References Cited

U.S. PATENT DOCUMENTS

| | | |
|---|---|---|
| 6,493,970 B1 | 12/2002 | McCarthy et al. |
| 6,609,106 B1 | 8/2003 | Robertson |
| 6,639,849 B2 | 10/2003 | Takahashi et al. |
| 6,732,459 B1 | 5/2004 | Clark |
| 6,868,964 B2 | 3/2005 | Carty et al. |
| 6,877,263 B2 | 4/2005 | Clark |
| 6,923,316 B2 | 8/2005 | Carty et al. |
| 7,117,168 B2 * | 10/2006 | Eaton .............................. 705/26 |
| 2002/0023009 A1 * | 2/2002 | Ikeda .............................. 705/26 |
| 2002/0096441 A1 | 7/2002 | Simpson |
| 2002/0188525 A1 | 12/2002 | Terada |
| 2003/0004815 A1 | 1/2003 | Sakai et al. |
| 2003/0004997 A1 | 1/2003 | Parker et al. |
| 2004/0133505 A1 | 7/2004 | Deneef |
| 2004/0182940 A1 | 9/2004 | Biller |
| 2004/0238394 A1 | 12/2004 | Fuemmeler |
| 2005/0154652 A1 | 7/2005 | Bezos et al. |

* cited by examiner

SYSTEM FOR SELECTING AND PURCHASING PRODUCTS FROM A PREDETERMINED MANUFACTURER OR RETAILER

This is a Continuation-In-Part of application Ser. No. 10/740,668 filed Dec. 22, 2003. The entire disclosure of the prior application Ser. No. 10/740,668 is hereby incorporated by reference.

BACKGROUND OF THE INVENTION

The present invention relates to a system for selecting and purchasing products from an assortment from a predetermined manufacturer or retailer.

It often happens that a person purchases a product for another person and offers this product in the form of a gift. Unfortunately, even if the product in question is of the type desired by the beneficiary of the gift, it also often happens that the person wished to receive another product of the same type; either the one received is not suitable for the beneficiary, or he/she already possesses an identical product.

The principle of the gift certificate or gift voucher is known and allows a person to acquire such a certificate or gift voucher in exchange for the payment of a certain price and to offer this certificate or gift voucher as a gift to another person who can then use it with a product distributor who accepts this method of payment for their goods. This system avoids the above-mentioned drawback connected with a gift consisting of a product which was not suitable for its beneficiary but amounts in the end to offering a sum of money to be used on different products and not a product proper, which displays on the part of the giver an attention to the likings of the beneficiary and therefore has more emotive value for the latter than a certificate or gift voucher. Moreover, the beneficiary of a gift certificate or gift voucher must travel to a sales outlet in order to make a choice amongst the products offered for sale in this outlet and use his/her certificate or gift voucher on the spot to acquire one of these products.

Another system is known from U.S. Pat. No. 6,633,849 which relates to methods and systems for electronically forwarding an online gift. In more details, a gift giver, while online with a gift server node, selects an online product for a recipient from a variety of products supplied from one or more vendors. Once a product selection is made, the product selection is sent to a queue on a gift server node while the recipient is notified of the product, typically via an electronic mail message. In response to the notification, the recipient then connects online to the gift server node, reads the product selection from the queue and determines whether to accept exchange or forward the product.

Unfortunately, the system according to U.S. Pat. No. 6,633,849 does not allow the gift giver to offer a physical gift to the recipient, thereby reducing the pleasure of the recipient who does not receive an object from hand to hand.

Moreover, the recipient needs to be connected to the internet and has to look at the gift through the personal computer without having really seen it. In addition, the gift giver does not really choose the kind of gifts he wants to offer to the recipient because this latter can exchange the offered product and even the kind of offered product.

SUMMARY OF THE INVENTION

It is an object of the invention to increase the pleasure of offering a gift to a recipient.

It is another object of the invention to allow the gift giver to choose the kind of gifts he intends to offer.

It is a further object to the invention to provide to the recipient the choice of the final gift without internet connection needed.

To this end, the system according to the invention comprises a first means, in the form of a physical receptacle, for containing a plurality of second means for presentation of a product or service from an assortment of various products and/or services from a predetermined manufacturer, provider and/or retailer, each product or service for which said second presentation means is contained by the said first means being chosen from said assortment, the system also comprising a voucher of a nominal value to be used for purchasing a product or service chosen from said assortment.

With the invention, the recipient can receive a physical gift system, being a physical receptacle, preferably a box, containing a plurality of potential gifts of one and the same type or from an assortment from which he can choose. Moreover, the recipient does not need an additional tool (such as a computer, the internet, an active e-mail address) to select the gift or gift voucher he wants to receive. Indeed, according to the invention, the recipient can choose his gift by looking at and/or listening to the plurality of second means for presentation of each product or service he can receive or by testing the product for which a second means for presentation is provided.

The system according to the invention therefore allows a first person who acquires it for said nominal value to give to another person, to whom the first person offers the system as a gift, the possibility of making a choice amongst a number of products and/or services, possibly of one and the same type, from an assortment and of ordering one of them, which can be delivered to them at home. Consequently, the invention solves the problem of an unfortunate choice by the giver of a product or service offered as a gift to another person since the latter can choose the product or service they prefer from amongst a large number, in practice generally of the order of ten or so, of products or services of the same type. The emotive power of the gift remains also, unlike the case of the gift certificate or gift voucher, since the choice of the product type offered is up to the giver.

With the system of the invention, the product can be chosen by the recipient from an assortment from a predetermined manufacturer, provider and/or retailer, thereby allowing the gift giver to choose the kind of gift he wishes to offer to the recipient. Moreover, by having a nominal value to be valued on an assortment of products and/or services, the flexibility of the system is increased. Indeed, in case of sales or promotions, the recipient will be very happy to receive more products and/or services in exchange for the same nominal value in vouchers.

By "assortment", it is meant a line of items or different various articles from one or more line of items, with or without specific link therebetween.

By "voucher", it is understood any representation, physical or otherwise, of said nominal value. It could take the form, for instance, of a separate physical voucher within said system, such as an order form, or of a representation of said nominal value on either the first and/or the second means.

The recipient of the system according to the invention can also make a choice from amongst a number of products and/or services from an assortment from a predetermined manufacturer, provider and/or retailer and receive one of them without travelling to an outlet selling these products or services, by consulting the second presentation means. Further, if the nominal value is too small, the recipient can add the lacking amount to receive what he really wishes.

Moreover, the nominal values of different systems according to the invention can vary strongly in order to make the systems easily accessible, adjustable to every person or situation, etc.

The invention also relates to a method for selling a product or service from said assortment by selling at least one system according to the invention and delivering a chosen product or service chosen from said assortment in exchange of at least one voucher of said at least one system.

The expression "presentation means" must be understood within the context of the present invention in the broad sense, namely any element representative of a product, whatever it is and whatever the medium of this representative element. It can be a physical sample of the product, a description or illustration of the product, a means of demonstrating the functions of the product, extracts of elements for which the product is the medium and any other means generally whatsoever allowing a person to imagine a product and consequently make a choice amongst a number of products of one and the same type.

Thus, the products for which the system comprises a presentation means can be of very varied types, as can the presentation means itself. By way of non-limiting examples, there can be cited cosmetic or perfumery items where small amounts, such as a few millilitres of perfume or grams of care product, are presented in small receptacles, books and comic strips where extracts are presented, subscriptions to various magazines where the flyleaves and extracts of articles are reproduced, games where the principle of one part and illustrations of their appearance are presented, music CDs where extracts of certain tracks are contained on a presentation CD, video DVDs where scenes of a film they contain are assembled on a presentation DVD, games consoles where the functions and performance are described, perhaps even a demonstration of each presented on DVD, wines where the characteristics are described, perhaps even a small amount contained in a receptacle. The same principle of presentation of products of one and the same type is also applicable to toys, do-it-yourself products, plane tickets, domestic electrical appliances, clothes, telecommunication products, games of chance, etc.

The system according to the invention can also be applied to the presentation and purchase of services of all types, instead of products.

The first means according to the invention can consist of any physical receptacle whatsoever, for example a box on which there is indicated the type of product or service whose presentation means are contained in the system.

The system according to the invention also has the advantage of allowing the offering for sale of a plurality of products or services of one and the same type without these products or services having to be physically present in a sales outlet, which can represent a saving of space which can furthermore result in a price of each of the products or services presented in the system which is more advantageous than that generally applied in conventional retail business.

Other characteristics and advantages of the invention will appear more clearly in the light of the following description of a particular non-limiting embodiment of the invention, while referring to the figures.

DETAILED DESCRIPTION

Figure 1:
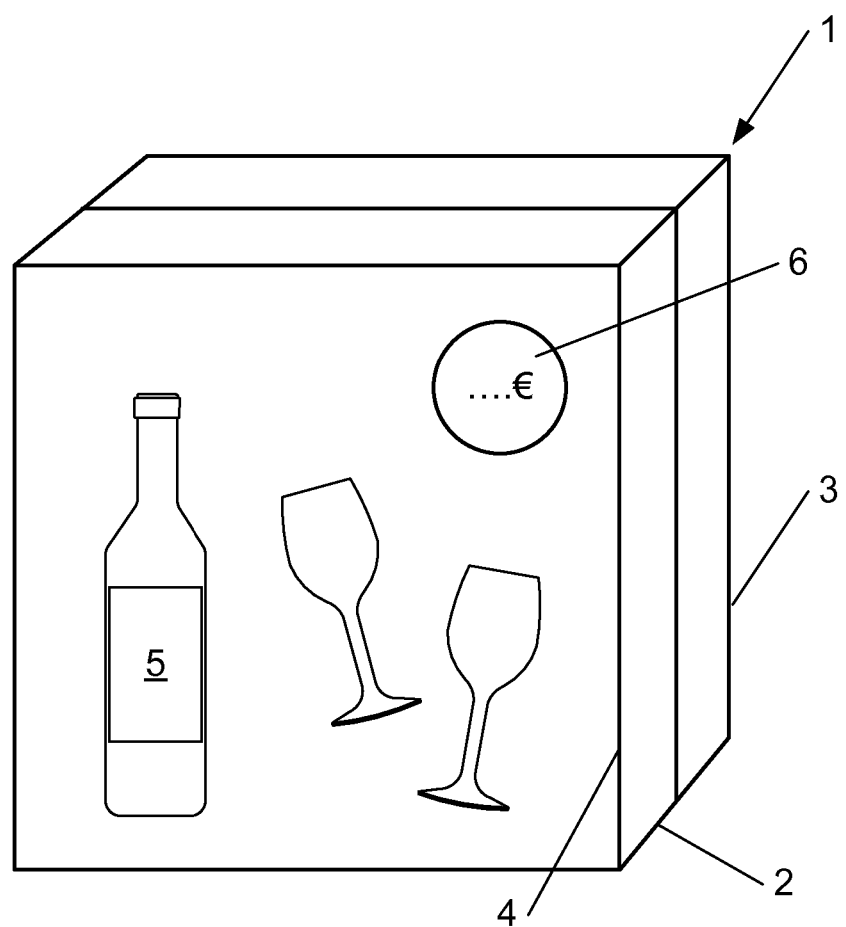
FIG. 1 is a view in perspective of an embodiment of the system for selecting and purchasing products from a scrambled assortment from a predetermined manufacturer or retailer according to the invention.

In the drawings, a same reference sign has been allotted to a same or analogous element of the system according to the invention.

Figure 2:
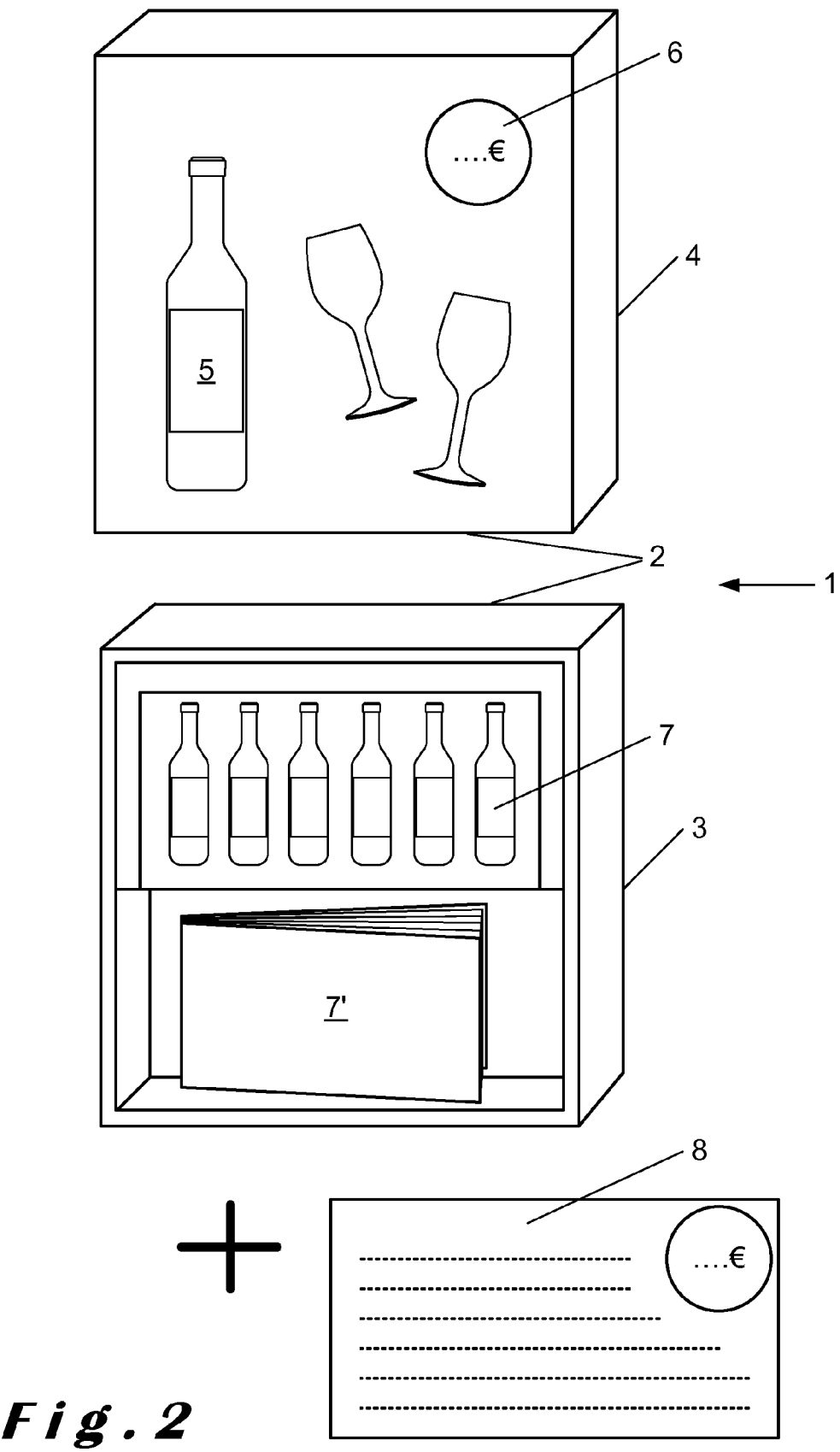
FIG. 2 is a view in perspective of the embodiment shown in FIG. 1 in an open position.

As it can be seen in FIGS. 1 and 2, the system 1 for selecting and purchasing products or services comprises a first means 2. The first means 2 is, in this embodiment, a box (for example a gift box) which comprises a lower portion 3 and an upper portion 4.

Preferably, the product or services 5 is illustrated onto the upper portion 4 of the first means 2.

As it can also be seen, a nominal value 6 is provided onto the upper portion 4 of the first means 2.

The system 1 according to the invention further comprises a plurality of second presentation means 7,7', included in the first means 2.

In this embodiment, the system 1 according to the invention, when acquired by a purchaser, allows the recipient who has received the present system to receive a physical gift. Then, the recipient will choose thanks to the second presentation means 7,7' which one he wishes to receive.

The second presentation means shown in FIG. 2 comprise a series of samples of wine to taste and a catalogue explaining the origins, the qualities, etc. Then, the recipient will exchange the nominal value 6 of the system according to the invention with all or a part of a wine bottle of the size commonly commercially found using an order form 8 as voucher for the nominal value 6.

Figure 3:
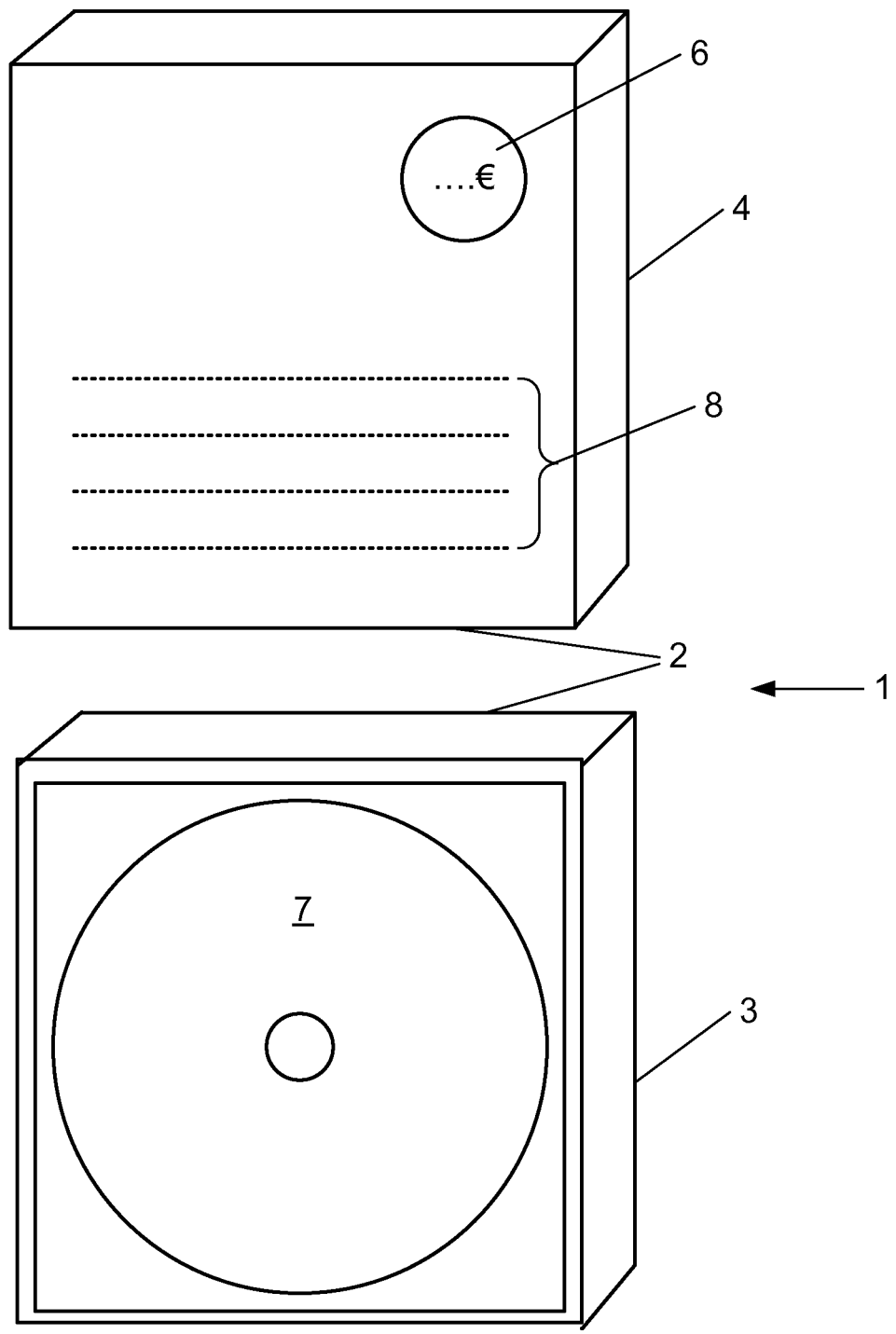
FIG. 3 is a view in perspective of a variant embodiment in an open position.

FIG. 3 shows a variant embodiment in which the second presentation means 7 consist in a digital information support representative of products or services, such a CD or a DVD 7.

If the subject of the system 1 according to the invention is related to movies, the DVD 7 will comprise samples of several films. The recipient can obtain the preferred film in exchange of at least the nominal value 6 (the nominal value 6 can correspond to the entire value of the gift or to a part of the value of the gift).

If the subject of the system 1 according to the invention is adventure or gastronomy, the DVD 7 will contain filmed or audio sequences relating to sensations to live or the site to be visited by the recipient.

In the illustrated embodiment, an order form 8 is printed or glued onto the upper portion 4 of the first means 2.

Figure 4:
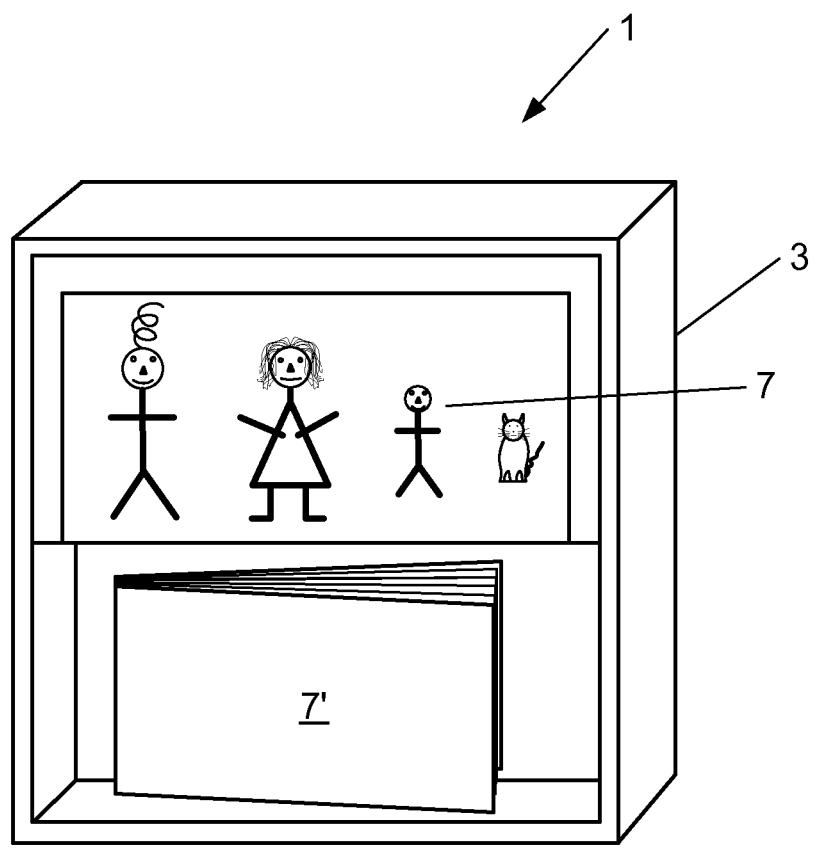
FIG. 4 is a view in perspective of another variant embodiment wherein the lower portion of the first means is illustrated.

In FIG. 4, the subject of the system is a particular game. The child receiving the system 1 according to the invention will benefit from several pleasures. The first is to receive a system according to the invention, the second one is to play with the samples (second presentation means 7), the third is to look in the catalogue for discovering what he can obtain in exchange for the predetermined nominal value 6 and the last one will be to receive the game obtained in exchange for the nominal value 6. The upper portion 4 and voucher are not shown in FIG. 4.

It should be understood that the invention is not intended to be limited to the described embodiments above and that several variations or modifications can be done without departing from the scope and spirit of the claims.

For example, the upper portion 4 of the box 2 can be articulated to the lower portion 3.

In addition, it is contemplated that several variations will be provided, for example, the wine samples can be replaced by spirit samples, gastronomic food samples, chocolates, perfume, cosmetics, etc.

It is also possible that any object that can be selected and purchased by the system 1 according to the invention can be obtained by exchanging the nominal value 6 of more than one system 1. For example, it can be contemplated that a parent intending to award his child can purchase one system according to the invention and allow his child to accumulate several vouchers and therefore several nominal values 6 without causing that the child has any physical money. Hence, the child can not buy anything he wishes without parent authorisation, he can only buy what the parents have intended to offer to him.

In another embodiment, the voucher can be directly printed onto the upper portion 4 of the second means comprising the nominal value 6 as aforementioned.

The invention claimed is:

1. A gift product for selecting and purchasing goods from a single manufacturer, provider and/or retailer, the gift product comprising:
   a physical receptacle containing a plurality of physical samples of goods from an assortment of various goods at various prices from said single manufacturer, provider and/or retailer;
   a voucher of a nominal value to be used for purchasing a good chosen from said assortment of various goods at various prices from said single manufacturer, provider and/or retailer, wherein said voucher being provided in said receptacle; and
   an order form for ordering said chosen good, said order form to be filled in with information relating to said good chosen and to an issuer or recipient of said order for said good.

2. The gift product according to claim 1, wherein said physical receptacle comprises a box.

3. The gift product according to claim 1, wherein said goods comprise one of: cosmetic items, perfumery items, wines, spirits or food samples and said physical sample comprises a small amount of said goods placed in a small receptacle.

4. The gift product according to claim 1, wherein said voucher is printed on or attached to said physical receptacle.

5. A gift product for selecting and purchasing goods from a single manufacturer, provider and/or retailer, the gift product comprising:
   a physical receptacle containing a plurality of physical samples of goods from an assortment of various goods at various prices from said single manufacturer, provider and/or retailer; and
   a voucher of nominal value to be used for purchasing a good chosen from said assortment of various goods at various prices from said single manufacturer, provider and/or retailer, said voucher being provided in said physical receptacle, said voucher comprises an order form for ordering chosen good, said order form to be filled in with information relating to good chosen and to an issuer or recipient of said order for said good.

6. The gift product according to claim 5, wherein said physical receptacle comprises a box.

7. The gift product according to claim 5, wherein said goods comprises one of: cosmetic items, perfumery items, wines, spirits or food samples and said physical sample comprises a small amount of said goods placed in a small receptacle.

8. The gift product according to claim 5, wherein said voucher is printed on or attached to said physical receptacle.

* * * * *